United States Patent
Peden et al.

(10) Patent No.: US 10,117,214 B1
(45) Date of Patent: Oct. 30, 2018

(54) TRIGGERING AN ACTION BASED ON DEVICE PRESENCE

(71) Applicant: Sprint Communications Company L.P., Overland Park, KS (US)

(72) Inventors: Mark Douglas Peden, Olathe, KS (US); Simon Youngs, Overland Park, KS (US); Thomas Michael Koch, Olathe, KS (US); Raymond Emilio Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 135 days.

(21) Appl. No.: 15/271,667

(22) Filed: Sep. 21, 2016

(51) Int. Cl.
*H04W 64/00* (2009.01)
*H04L 29/08* (2006.01)
*H04B 17/318* (2015.01)
*H04L 12/26* (2006.01)

(52) U.S. Cl.
CPC .......... *H04W 64/00* (2013.01); *H04B 17/318* (2015.01); *H04L 43/16* (2013.01); *H04L 67/24* (2013.01); *H04L 67/303* (2013.01); *H04L 67/306* (2013.01)

(58) Field of Classification Search
CPC ....... H04W 64/00; H04W 12/08; H04W 4/12; H04W 4/02; H04W 84/12; H04W 84/18; H04M 1/725; H04L 29/08; H04L 67/303; H05W 84/20; G06Q 30/02; G06Q 20/32
See application file for complete search history.

(56) References Cited

U.S. PATENT DOCUMENTS

2014/0365304 A1* 12/2014 Showers ................ G06Q 30/02
 705/14.55
2017/0046024 A1* 2/2017 Dascola .............. G06F 3/04886
2018/0047055 A1* 2/2018 DeWitt ............. H04M 1/72572

* cited by examiner

*Primary Examiner* — Nizar Sivji

(57) ABSTRACT

Systems and methods provide for triggering an action based on detection of one or more user devices. One or more signals from at least one user device are detected by at least one sensor in a target area. A sensor can be in operable communication with a location server to which the signals are relayed. Based on the signals detected, a determination is made as to whether the one or more signals exceed a predetermined threshold for signal strength in the target area. Based on a set of signals exceeding the predetermined threshold for signal strength, the location server triggers an action that corresponds to the target area.

18 Claims, 4 Drawing Sheets

TRIGGERING AN ACTION BASED ON DEVICE PRESENCE

SUMMARY

A high level overview of various aspects of the invention is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter. The scope of the invention is defined by the claims.

In brief, and at a high level, this disclosure describes, among other things, methods and systems for leveraging data across user devices and communication networks to create triggers for other processes, applications, or devices. For example, embodiments disclosed herein may take into account radio frequency signals from mobile devices and leverage these signals for various applications.

BRIEF DESCRIPTION OF THE DRAWINGS

The features of the invention noted above are explained in more detail with reference to the illustrative embodiments in the attached drawing figures, in which like reference numerals denote like elements, wherein.

DETAILED DESCRIPTION OF THE INVENTION

Figure 1:
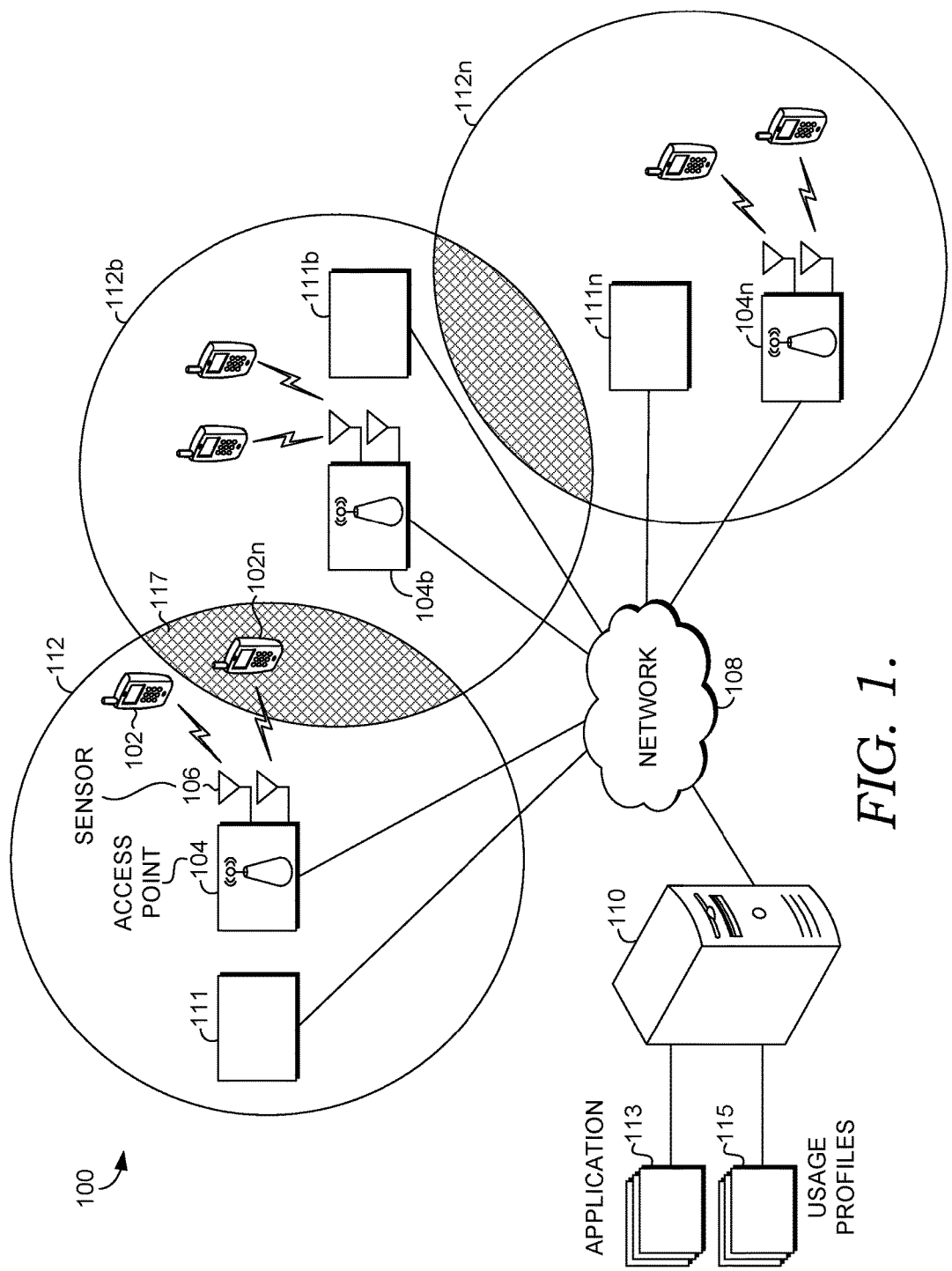
FIG. 1 illustrates an exemplary network diagram including an access point in communication with at least one user device, in accordance with an aspect of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations may be used to aid the understanding of certain concepts pertaining to the associated network system, services, and devices. These acronyms and shorthand notations are intended to help provide an easy methodology of communicating the ideas expressed herein and are not meant to limit the scope of the present invention. Further, various technical terms are used throughout this description. An illustrative resource that fleshes out various aspects of these terms can be found in Newton's Telecom Dictionary, $27^{th}$ Edition (2012).

Embodiments of the present technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

In accordance with implementations of the present disclosure, an access point is configured to detect a signal from one or more user devices and used to determine whether to trigger an action by a location server that is in operable communication with the access point. An access point, for example, may be a macro cell (e.g., base station). While macro cell and base station are both used herein, a base station is just one example of a macro cell, and while the terms are used interchangeably, other macro cells may be used in aspects herein. The access point may include an array of one or more sensors, for example an antennae, configured to detect signals from a user device and transmit one or more signals from one or more user devices to the location server. A location server, as used herein, can be local, remote, hosted on a cloud system, or any configuration allowing communication with the access point.

The terms "macro cell," "base station," "base station receiver," "access point," and "access component" may be used interchangeably in this disclosure. The terms "user device," "mobile device," "mobile handset," and "mobile transmitting element" may be used interchangeably in this disclosure. In relating these two elements, an access point and a mobile handset may be paired for uplink and downlink transmission for communication or exchange of RF transmissions over a network. A "transmitting/receiving component" or "communication component" refers to an element associated with a access point that transmits and receives signals to a broadcast arc served by the access point, and is configured to transmit and receive signals to and from user devices, for example mobile handsets.

In aspects of the present disclosure, a method for leveraging mobile device detection is provided. An access point comprising a transmitting/receiving component may be provided. The transmitting/receiving component can, for example, be one or more antennae, such as an antennae array. In this manner, an access point can capture data, such as a signal, from a user device. Based on the configuration of the system, one or more access points can capture signals from one or more user devices in across a given area. The access point can transmit detected signals from one or more user devices to a server in operable communication with the access point and the server may further aggregate or collect the signals, and utilize them to trigger any number or processes. For example, a trigger can be used to turn lights on and off, activate heating or cooling systems, engage or disengage alarm systems, turn on or control security cameras, and others. In an embodiment, an access point can be strategically installed in, for example, a building or structure, in order to detect signals from one or more user devices. If it is determined that the signal strength received and/or aggregated by the server is sufficient (e.g. meets a pre-determined threshold), an activity level can be determined and utilized to trigger an action.

In other aspects of the present disclosure, a method for leveraging mobile device detection is provided that can include integration of a network carrier. In such an instance, network carriers may provide assistance in determining or capturing data from a user device in a given area in order to obtain more granular data about one or more user devices. A network carrier may provide a location server with device details in response to a request, for example, location data for one or more specific devices, number of devices in a given location registered with the network carrier, and the timestamp of the last location of a user device. A location server could then know granular details about one or more user devices associated with that network carrier. The location server in turn might then determine the user device activity within a given area based upon devices that have registered with the network carrier and subsequently trigger an action. In other words, in this general embodiment, a location server can detect the presence of user devices in a given target area, as well as their signal strength to at least derive an activity level, or a device density profile for a target area. Once one or more signals are detected by at least one sensor and transmitted to a location server, the location server may query the network carrier for data about those detected signals. In some embodiments, a network carrier could provide periodic data to a location server, for storage in, for example, a database for the location server to query. In some embodiments, a location server may aggregate one or more detected signals over any given amount of time and query a network carrier based on the aggregation of signals.

Accordingly, in a first aspect, a method for causing an action to be triggered based on detecting a presence of one or more user devices is provided. At least one sensor can detect one or more signals from one or more user devices in a given target area. In other words, the at least one sensor or at least one access point may receive one or more signals emitted from a user device. Based on the detected signals, a location server may determine that a set of one or more signals exceeds a predetermined threshold for signal strength in a target area. A target area is defined for each access point or sensor array. Based on a determination of signals exceeding a predetermined threshold, a location server may subsequently trigger an action corresponding to a target area.

In a second aspect, a method for causing an action to be triggered based on detecting a presence of one or more user devices is provided, utilizing network carrier provided information. At least one sensor can detect one or more signals from one or more user devices in a given target area. In other words, the at least one sensor or at least one access point may receive one or more signals emitted from a user device. Based on the detected signals, a location server may determine that a set of one or more signals exceeds a predetermined threshold for signal strength in a target area. In embodiments of the present invention, the location server may make continuous determinations, or it may aggregate the signals. Based on the determination, the location server may query a network carrier to provide data associated with the one or more signals. A network carrier can subsequently send detailed information about the identified signals and user devices within a given target area. Based on a determination of signals exceeding a predetermined threshold, as well as the data received from a network carrier, a location server may subsequently trigger an action corresponding to a target area.

In a third aspect, a system for causing an action to be triggered based on detecting a presence of one or more user devices is provided. The system comprises one or more processors and one or more computer storage media storing computer-useable instructions that, when executed by the one or more processors, cause the one or more processors to perform operations. These operations comprise detecting, by at least one sensor, one or more signals from at least one mobile device in a target area, and determining that the set of the detected one or more signals exceeds a predetermined threshold for signal strength in the target area. Further, these operations comprise triggering, by a location server communicatively coupled to the at least one sensor, an action corresponding to the target area based on the set of signals exceeding the predetermined threshold for signal strength.

Referring now to the drawings in more detail and initially to FIG. 1, an exemplary network diagram 100 including at least one access point 104, 104*b*, 104*n* is depicted in accordance with an aspect of the present disclosure. An access point 104, 104*b*, 104*n* can be connected to a location server 110 via a network 108, such that the access point 104, 104*b*, 104*n* and the location server 110 are in operable communication. Any number of access points 104, 104*b*, 104*n*, may be connected to the location server 110 via the network 108 such that the access points 104, 104*b*, 104*n* operate independently and in parallel. Further, each access point 104, 104*b*, 104*n* can be assigned a unique identifier that is known by the location server 110. While FIG. 1 only depicts one location server, aspects of the present disclosure contemplate that a location server can be configured as multiple local servers operating together or one or more remotely hosted servers, or a combination comprising at least one of the foregoing. The access point 104, 104*b*, 104*n* comprises at least one transmitting/receiving component, or sensor, such as an antennae array 106 to enable communication with at least one user device 102. While two antennas are depicted in FIG. 1 associated with access point 104, 104b, 104n, any number of antennas may be utilized herein.

The access point 104, 104b, 104n can include one transmitting/receiving component 106 or multiple transmitting/receiving components 106 arranged as an array, which can communicate with one or multiple user devices 102, 102n, over a range of frequencies. These transmitting/receiving components may be antennas, more specifically RF transmitters/receivers controlled by the access point, and can cover individual or overlapping broadcast ranges. A broadcast range for any number of access points 104, 104b, 104n may be tuned to define a target area 112, 112b, 112n; a target area may be defined by one access point 104 or by a plurality of access points 104, 104b, 104n having independent broadcast ranges. It will be appreciated by those skilled in the art that any number of access point and broadcast sector combinations and configurations are contemplated by the present disclosure. A user device 102 can emit a signal that is detectable by the access point 104, 104b, 104n which is configured to detect that emitted signal. For example, a user device 102 may emit an RF signal, which is picked up by the access point 104 and transmitted to a location server 110, which acknowledges the presence of the user device 102 within the target area 112. In other words an access point 104 listens for the registration request of a device, for example an RF signature pattern or RF signal strength from a device, and transmits that signal to the location server 110. It will be appreciated that an access point 104 in combination with a location server 110 are able to differentiate RF signatures, for example between network carriers where each network carrier is assigned a range of frequency that is different from the others or between user device type.

The location server 110 can aggregate the signals received and determine that a requisite activity level has been met for a given target area 112, 112b, 112n. Alternatively, in some embodiments, the location server 110 can continuously determine a requisite activity level has been met without first aggregating signals. A requisite activity level may be determined through the use of a predetermined threshold value. For example, the location server 110 can determine, for each target area, whether the detected RF signals meet a predetermined threshold strength. It will be appreciated that the strength of an RF signal emitted from a user device 102 can vary as a function of position relative to the access point 104, 104b, 104n. An access point 104, 104b, 104n, or sensor array may determine signal strength based on a received signal strength indicator (RSSI) measurement. In one embodiment, based on aggregated signal strength across the target area 112, a location server 110 may determine a user device density profile for the target area 112. In this way the system can know how densely a target area 112 is populated and where individuals are within the target area 112. An access point 104 may then further pick up signal traffic within its target area 112 over time. A user device density profile for a given target area 112 can thus be known at a point in time or as a function of time. Further, multiple access points 104, 104b may work in tandem to know where a user device is within their target areas 112, 112b, particularly when target areas 112, 112b overlap 117. For example the access points 104, 104b may triangulate the signal emitted from a given user device 102n. In this instance a location server 110 can know the location of a user device with respect to more than one access point 104, 104b and more than one target area 112, 112b.

An access point 104, 104b, 104n can be tuned to filter out "noise," such as a detected signal that is within the target area 112, 112b, 112n but does not meet a threshold signal strength for the access point 104, 104b, 104n to transmit that signal to the location server 110. Further, in some embodiments, the location server 110 may determine that a signal detected by an access point 104, 104b, 104n does not meet a threshold signal strength. Noise filtering may also be based on time/day parameters, i.e. at a first day/time point a detected signal would meet a threshold signal strength so that the access point 104, 104b, 104n transmits the signal to the location server 110, but at a second day/time point the same detected signal would not meet the same threshold signal strength.

The location server 110 further comprises any number of applications 113 that can be triggered in response to signals detected within a target area 112, 112b, 112n; if a location server 110 determines that a requisite activity level in a target area 112, 112b, 112n is met, or that the requisite activity level in a target area 112, 112b, 112n has fallen below a threshold level, the location server 110 can run an application that triggers an activateable system 111, for example, an HVAC system, a lighting system, an alarm system, and the like. One or more activateable systems 111, 111b, 111n may be triggered in one or more target areas 112, 112b, 112n simultaneously. In this way the location server 110, knowing the unique identifier associated with an access point 104, 104b, 104n and thus knowing its position, can take action in the associated target area 112, 112b, 112n via a rules based engine. As an illustrative example, a number of access points may be located strategically throughout an office building (e.g. in each corner of every floor) and each access point has a pre-tuned target area. Each access point, when active, listens for RF signatures associated with user devices within its target area. Two user devices may come within the arc of the target area of one of the access points and emit registration signals, which are then detected by the access point and transmitted to a location server. The location server determines that the threshold level is met to trigger the HVAC system within the associated target area, and runs the application to turn on the HVAC system in that target area. Continuing in the same scenario, one of the user devices is removed from the target area arc of that same access point, and upon the next registration request sent by each user device the access point detects only one signal, which is transmitted to the location server. The location server determines that the threshold level to trigger the HVAC system within the associated target area is no longer met, and turns off the HVAC system in the target area.

In embodiments of the present disclosure, usage profiles 115 may be created for one or more activatable systems 111, 111b, 111n based on varying requisite activity levels or different density profiles. For example, if the location server 110 determines that the access point 104 is receiving more signals that are stronger, thus giving a high density profile to a target area 112, an application 113 may utilize a first usage profile 115 associated with a lighting system that activates all the lights to full power. Alternatively, if the location server 110 determines that the access point 104 is receiving less or weaker signals, thus giving a low density profile to a target area 112, an application 113 may utilize a second usage profile 115 associated with a lighting system that activates only half the lights or activates the lights to only half power.

Figure 2:
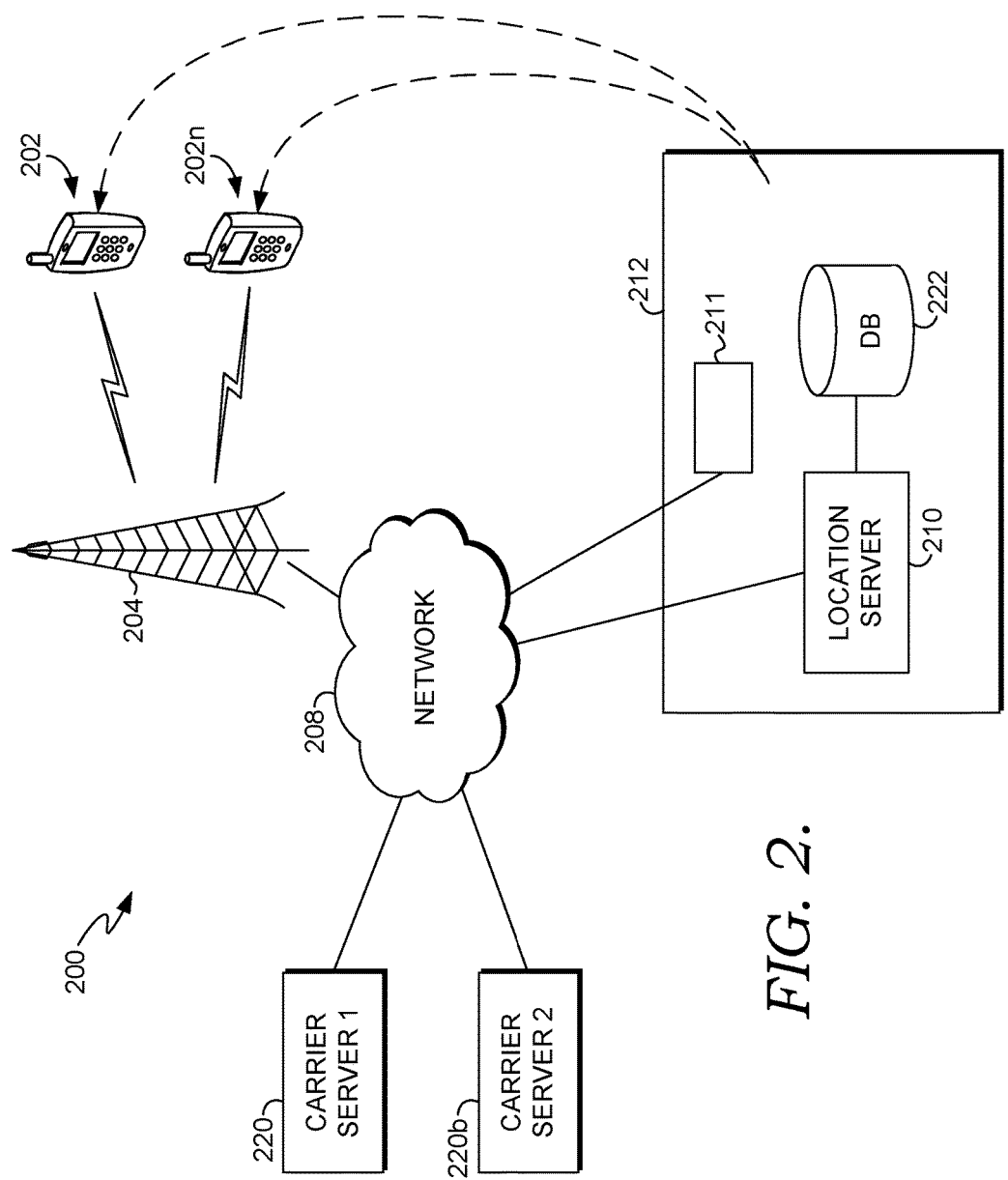
FIG. 2 illustrates an exemplary network diagram including an access point in communication with at least one user device, in accordance with an aspect of the present disclosure.

Referring now to FIG. 2, an exemplary network diagram 200 including an access point 204 is depicted in accordance with an aspect of the present disclosure. The access point 204 includes at least one transmitting/receiving component or antennae array to enable communication with at least one user device 202, 202n. The access point 204 can be in operable communication with a location server 210 via a network 208. Although FIG. 2 depicts access point 204 as a macrocell, the base station could alternatively be implemented as a small cell, for example a femtocell or picocell, or any suitable access point. The network 200 further comprises a target area 212 to which the broadcast range of the access point 204 is tuned. The target area 212 could be any general area, such as, for example, an office building, a parking garage, a parking lot, a grocery store, a mall, and so forth. The foregoing list is merely exemplary and not limiting in any way. The location server 210 may be physically at a location, such as within the target area 212, or it could be remote or some combination of the two. Further, other components may be connected to the location server 210 either directly or through the network 208, for example, a database 222. At least one carrier server can be connected to the location server 210 through network 208 as well. For example, a first carrier server 218 belonging to a first network carrier may be connected to the network 208, and a second carrier server 220 belonging to a second network carrier may also be connected to the network 208. Alternatively, in some instances, both carrier servers could belong to the same network carrier.

When active, access point 204 listens for registration requests, more particularly propagated RF signals, from one or more user devices 202, 202*n* in a given target area 212. While the user device 202 is shown as a mobile device, it may take on a variety of forms, such as for example: a personal computer, a smart phone, a smart watch, a laptop computer, a mobile phone, a tablet computer, a wearable computer, a personal digital assistance (PDA), a server, a handheld communications device, or any combination of such devices. Further, a user device may be some equipment or consumer product with an integrated signal transceiver, for example a car. Access point 204 can then transmit the signals from the one or more user devices 202, 202*n* to a location server 210, associated with the target area 212, via the network 208. Based on a signal strength or pattern, the location server 210 can know the location of a user device 202, 202*n* within the given target area 212. Further, the location server 210 can build or update a user device density profile for the target area 212 stored on a connected database 222 along with usage profiles that can be associated with connected activateable systems 211. In this manner, the location server 210 can know the number of user devices 202, 202*n* within target area 212, and their location. When active, the access point 204 actively relays signal information to the location server 210 such that data points for user devices 202, 202*n* can be continuous and stored as a function of time.

At any given point in time, the location server 210 can use the signal information received from the access point 204 to query one or more carrier servers 220, 220*b*. The one or more carrier servers 220, 220*b* may provide further information about the user devices 202, 202*n* back to the location server 210. For example, if a device in the target area 212 is registered with the specific network carrier, a carrier server 220, 220*b* may provide how many of a specific network carrier's devices are within the area, and even more specifically, device identity information. In an embodiment, richer device data may be utilized to enforce policies associated with the applications and usage profiles driving the activateable systems in the target area. In another embodiment, richer device data may be utilized in emergency situations or crowdsourcing data situations.

Location server 210 may also store user device information on a connected database 222 so that the number of requests send to the carrier server is reduced. Further, database 222 may be used to store user device information received from a network carrier that is deemed to have "opted-in" to the system. In such an instance, the location server 210 would only recognize those signals associated with user devices already stored in database 222 when received from the access point. Only when a threshold level or activity level is met from those signals from previously identified user devices 202, 202*n* would location server 210 trigger an action.

Figure 3:
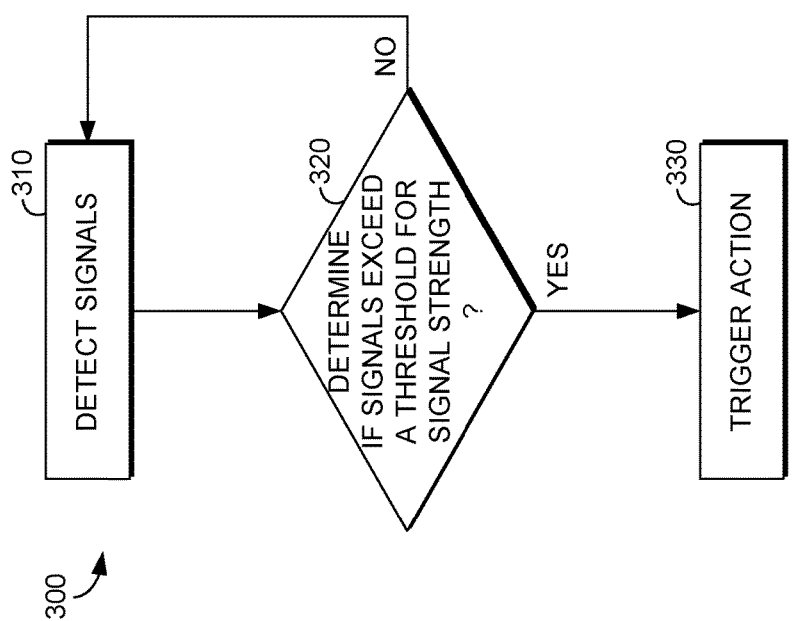
FIG. 3 illustrates a flow diagram of an exemplary method of user device detection, in accordance with an aspect of the present disclosure.

Referring now to FIG. 3, a flow diagram of an exemplary method 300 for causing an action to be triggered based on detecting a presence of one or more user devices is provided in accordance with embodiments of the present invention. At block 310, an access point or antenna array is provided for detecting one or more signals from at least one mobile device in a target area. At block 320, the access point transmits one or more detected signals to a location server, which determines if the signals exceed a threshold for signal strength in the target area; if they don't the access point will continue to listen for signals before proceeding to a subsequent step. Optionally at block 320, one or more signals may be aggregated by a location server. At block 330, if the set of signals exceed the predetermined threshold for signal strength then a location server triggers an action corresponding to the target area.

Figure 4:
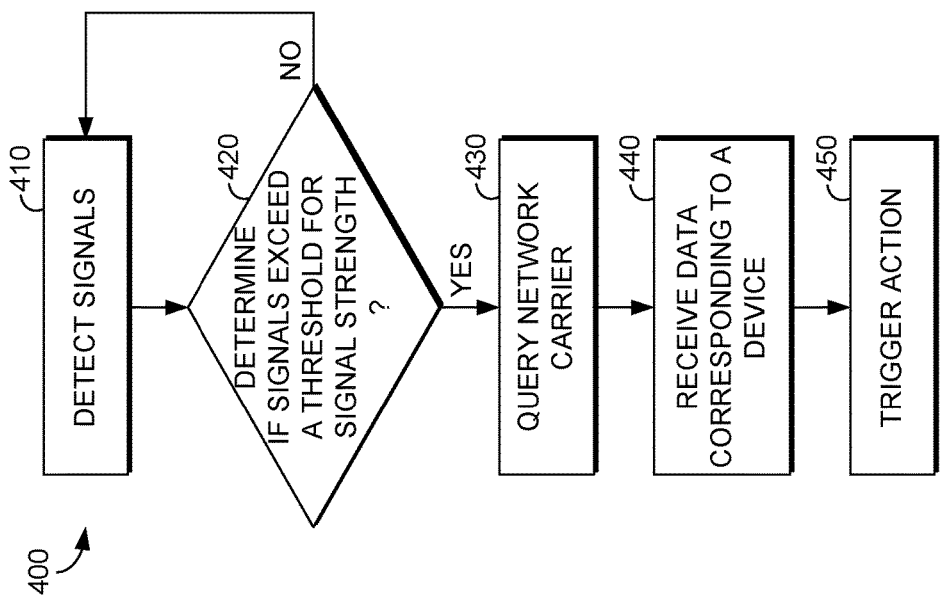
FIG. 4 illustrates a flow diagram of an exemplary method of user device detection, in accordance with an aspect of the present disclosure.

Referring now to FIG. 4, a block diagram of a first exemplary method 400 for causing an action to be triggered based on detecting a presence of one or more user devices is provided in accordance with embodiments of the present invention. At block 410, an access point or antennae array is provided for detecting one or more signals from one or more devices in a target area. The access point is in operable communication with a location server. At block 420, a determination is made that the set of detected one or more signals exceeds a predetermined threshold for signal strength in a target area. If the one or more signals do not exceed the predetermined threshold for signal strength, the access point will continue to detect signals before moving to a subsequent step. At block 430, the location server can query a network carrier or a connected database for data associated with the one or more signals or the one or more user devices in a corresponding target area. At block 440, in response to data returned by the query, a location server may or may not trigger an action corresponding to the target area. In one embodiment, the location server does not trigger an action but provides detailed information regarding devices in a given target area.

Figure 5:
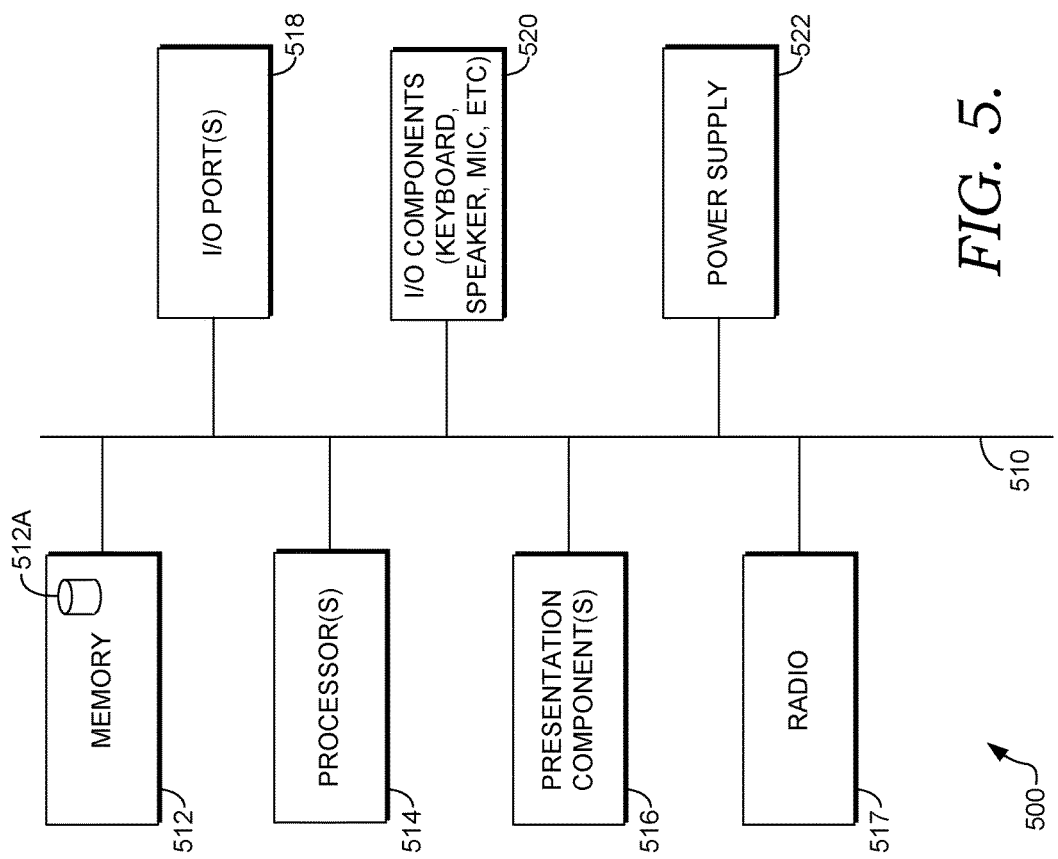
FIG. 5 depicts a diagram of an exemplary computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many variations can be made to the illustrated embodiment of the present invention without departing from the scope of the present invention. Such modifications are within the scope of the present invention, and would be readily apparent to one of ordinary skill in the art, but would not depart from the scope of the present invention. Further, many different arrangements of the various components depicted, as well as components not shown, are possible without departing from the scope of the claims below. Embodiments of the technology have been described with the intent to be exemplary rather than restrictive. Alternative embodiments will be apparent to readers of this disclosure after and because of reading it. Alternative means of implementing the aforementioned can be completed without departing from the scope of the claims below.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:
1. A method for causing an action to be triggered based on detecting a presence of one or more user devices, the method comprising:
    detecting, by at least one sensor, one or more wireless signals from at least one mobile device in a target area;
    aggregating, by a location server communicatively coupled to the at least one sensor, two or more wireless signals corresponding to the target area;

determining that an aggregate signal strength corresponding to the detected wireless signals exceeds a predetermined threshold for signal strength in the target area;
determining a user device density profile for the target area, wherein the density profile is a function of one or more user devices and the aggregate signal strength for the target area; and
triggering, by the location server communicatively coupled to the at least one sensor, an action corresponding to the target area based on the user device density profile.

2. The method of claim 1, wherein the one or more signals comprise radio frequency signals emitted by the at least one user device.

3. The method of claim 1, wherein the sensor is at least one of a microcell, a microcell, or a sensor array.

4. The method of claim 1, wherein the location server comprises an applications engine that is in operable communication with an activateable system in the target area, the location server further comprising at least one usage profile associated with the activateable system.

5. The method of claim 4, wherein the location server selects a usage profile to be used in conjunction with an activateable system based on the user device density profile for the target area.

6. The method of claim 5, wherein the activateable system is at least one of an HVAC system, a lighting system, a security system, or a combination comprising at least one of the foregoing.

7. The method of claim 5, wherein the triggered action includes the engagement or disengagement of at least one activateable system, and wherein the engagement or disengagement is based on the usage profile.

8. The method of claim 4, wherein one or more usage profiles determine the threshold for signal strength in the target area.

9. The method of claim 1, wherein the at least one sensor has a unique sensor identifier.

10. A method for causing an action to be triggered based on detecting a presence of one or more user devices, the method comprising:
detecting, by at least one sensor, one or more wireless signals from at least one mobile device in a target area;
aggregating, by a location server communicatively coupled to the at least one sensor, two or more wireless signals corresponding to the target area;
determining that the aggregate signal strength corresponding to the detected wireless signals exceeds a predetermined threshold for signal strength in the target area;
determining a user device density profile for the target area, wherein the density profile is a function of one or more user devices and the aggregate signal strength of the detected signals in the target area;
querying a carrier to provide data associated with the detected one or more wireless signals;
receiving data corresponding to at least one user device in response to the query; and
triggering, by the location server communicatively coupled to the at least one sensor, an action corresponding to the target area based on the user device density profile and the data corresponding to at least one user device.

11. The method of claim 10, wherein the one or more mobile devices have registered on the location server.

12. The method of claim 10, wherein the one or more signals comprise radio frequency signals emitted by the at least one user device.

13. The method of claim 10 further comprising determining a density profile of the target area based on the registered devices.

14. The method of claim 10, wherein the location server comprises an applications engine that is in operable communication with an activateable system in the target area, the location server further comprising at least one usage profile associated with the activateable system.

15. The method of claim 14, wherein the location server is communicatively coupled to at least one of an HVAC system, a lighting system, a security system, or a combination comprising at least one of the foregoing.

16. The method of claim 14, wherein the triggered action includes the engagement or disengagement of at least one system, wherein the engagement or disengagement is based on the usage profile.

17. The method of claim 10, wherein the at least one sensor has a unique sensor identification.

18. A system for causing an action to be triggered based on detecting a presence of one or more user devices, the system comprising:
one or more processors; and
one or more computer storage media storing computer-useable instructions that, when executed by the one or more processors, cause the one or more processors to perform operations comprising:
detecting, by at least one sensor, one or more signals from at least one mobile device in a target area;
aggregating, by a location server communicatively coupled to the at least one sensor, two or more wireless signals corresponding to the target area;
determining that an aggregate signal strength corresponding to the detected wireless signals exceeds a predetermined threshold for signal strength in the target area;
determining a user device density profile for the target area, wherein the density profile is a function of one or more user devices and the aggregate signal strength for the target area; and
triggering, by the location server communicatively coupled to the at least one sensor, an action corresponding to the target area based on the user device density profile.

* * * * *